A. H. BAKKEN.
CENTRIFUGAL CLUTCH.
APPLICATION FILED MAR. 7, 1913.
1,135,092.
Patented Apr. 13, 1915.
2 SHEETS—SHEET 1.
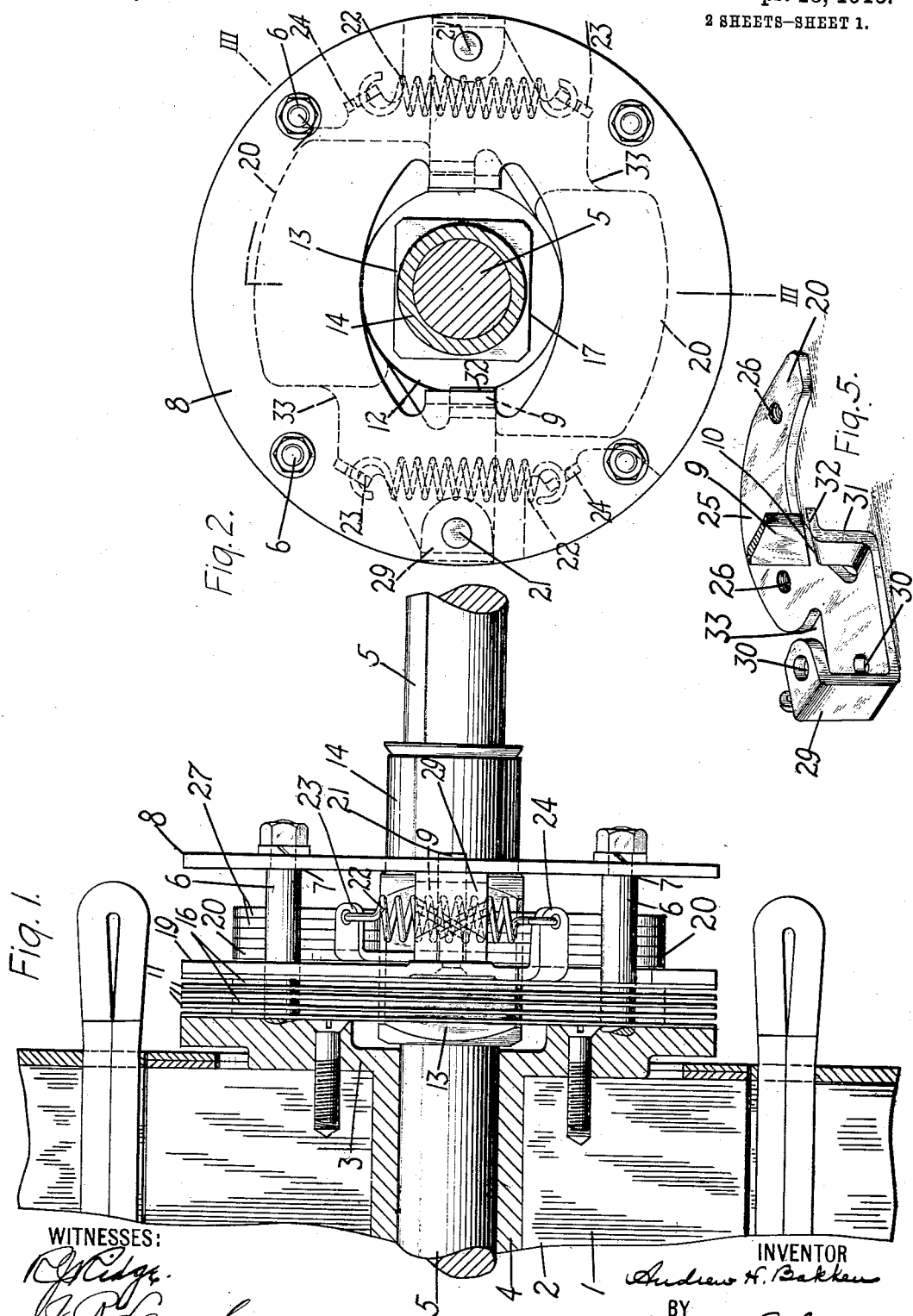
WITNESSES:
INVENTOR
Andrew H. Bakken
BY
Wesley G. Carr
ATTORNEY A. H. BAKKEN.
CENTRIFUGAL CLUTCH.
APPLICATION FILED MAR. 7, 1913.
1,135,092.
Patented Apr. 13, 1915.
2 SHEETS—SHEET 2.
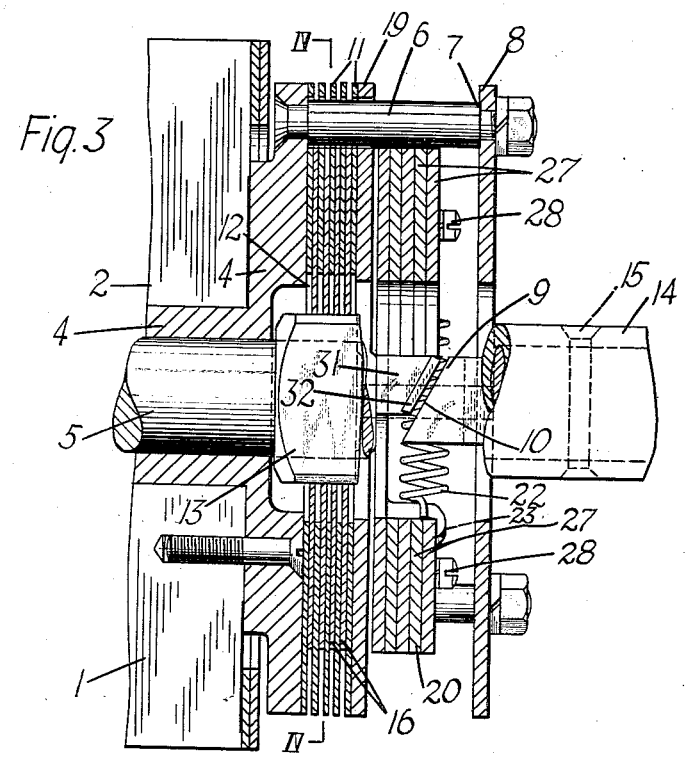
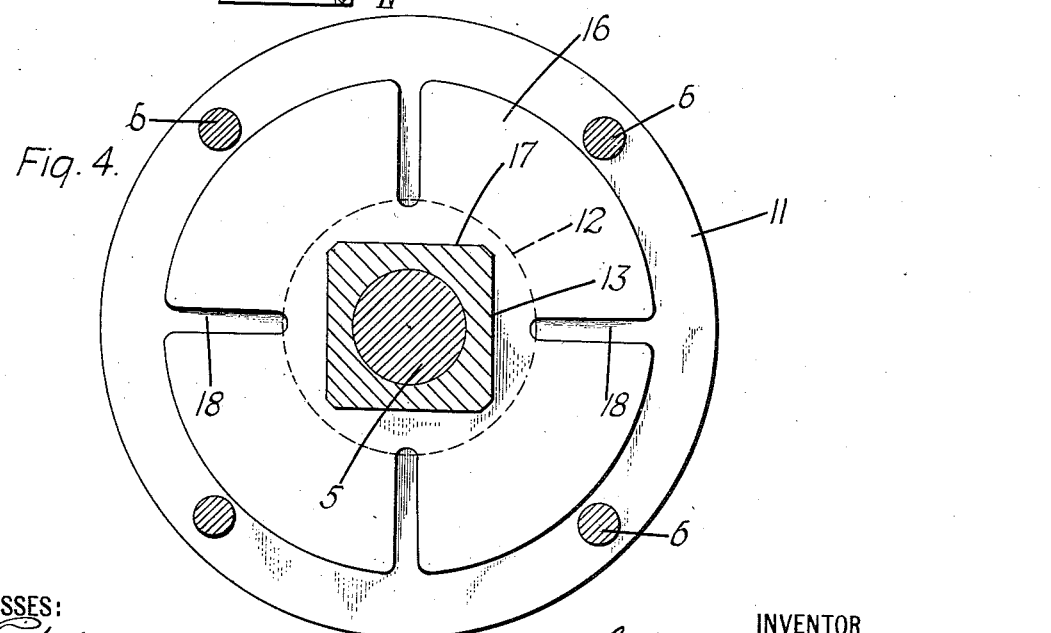
WITNESSES:
INVENTOR
Andrew H. Bakken
BY
Wesley G. Carr
ATTORNEY

UNITED STATES PATENT OFFICE.

ANDREW H. BAKKEN, OF WILKINSBURG, PENNSYLVANIA, ASSIGNOR TO WESTINGHOUSE ELECTRIC AND MANUFACTURING COMPANY, A CORPORATION OF PENNSYLVANIA.

CENTRIFUGAL CLUTCH.

1,135,092.  Specification of Letters Patent.  Patented Apr. 13, 1915.

Application filed March 7, 1913. Serial No. 752,615.

*To all whom it may concern:*

Be it known that I, ANDREW H. BAKKEN, a citizen of the United States, and a resident of Wilkinsburg, in the county of Allegheny and State of Pennsylvania, have invented a new and useful Improvement in Centrifugal Clutches, of which the following is a specification.

My invention relates to centrifugal clutches and it has special reference to clutches which are adapted for use with motors having small starting torque as, for example, single-phase induction motors.

My invention has for one of its objects to provide a compact structure which may be mounted within a very small space.

A further object of my invention is to provide a construction in which the friction per unit area of the engaging surfaces of the clutch members is materially reduced.

It is well known that certain types of motors have small starting torque and, by reason of this fact, they are unable to start under load. Centrifugal clutches have been employed which connect the motor to the load after a predetermined speed is reached and a sufficient torque is developed to enable the motor to operate. The clutches customarily employed have centrifugal arms provided with engaging surfaces which engage directly with corresponding surfaces connected to the load. This construction requires either heavily weighted arms or large friction surfaces and, in either case, the clutch must be relatively large. The direct engagement of the arms with the load requires that the friction per unit area of surfaces must be relatively high. In my invention, I propose to avoid the above objections by arranging the centrifugal members to operate as levers and thus greatly increase the effect of their action which allows the size of the weights to be reduced. The friction surfaces are provided on members separate from the arms and a relatively large area of friction surface is presented. The clutch may be used in connection with motors where the available space in the end bell or inclosing frame is too small for the ordinary construction. The wear of the engaging surfaces is reduced since the friction per unit area is much less and the life of the mechanism is correspondingly increased.

In the drawings, Figure 1 is a longitudinal section of a portion of the rotor of an electric motor with the clutch attached thereto. Fig. 2 is a view, partially in elevation and partially in section, of the clutch and the motor shaft. Fig. 3 is a sectional view on line III—III of Fig. 2. Fig. 4 is a sectional view on line IV—IV of Fig. 3. Fig. 5 is a view, in perspective, of a centrifugal lever and a portion of an engaging member.

The rotor 1 of an electric motor, that comprises a core and a spider 3 having a hub 4, is rotatably mounted on a shaft 5 which may be connected to the load in any suitable manner. The clutch structure is attached to the spider by studs 6 having shoulders 7 against which is clamped a plate member 8. The plate 8 is provided with two arms 9 extending axially toward the rotor and having inclined end portions 10. Friction disks 11, of any suitable number, are slidably mounted on the studs 6 and are provided with concentric circular openings 12 to provide a clearance between the disks 11 and the square portion 13 of a sleeve member 14 rigidly fastened to the shaft 5 by a rivet or pin 15. A second set of friction disks 16 are provided with square central openings 17 which fit the square portion 13 of the sleeve 14 upon which they are mounted, and with radial slots 18. The disks 16 are arranged alternately between the disks 11 and are of such diameter as to lie within the studs 6. A ring shaped plate member 19 is slidably mounted on the studs 6 adjacent the outer disks 11, and is adapted to exert pressure against the disks when actuated as later described. Two lever arms 20, adapted to be actuated by centrifugal force are pivoted upon pins 21. The arms 20 are normally held in a retracted position by springs 22 which are attached to ears 23 on the arms 20 and to ears 24 attached to the plate member 19.

The levers 20, one of which is shown in detail in Fig. 5, severally comprises a flat semicircular portion 25 provided with holes

26 by means of which weights 27 may be fastened by screws 28. The levers are provided with upturned portions 29 having holes 30 for mounting on the pivots 21. An arm 31, having an inclined portion 32, which is adapted to engage the inclined end 10 of one of the arms 9, is formed by bending or pressing a portion of the metal of the lever 20. The levers are recessed at 33 to receive the studs 6 when the weights fly outward as the speed increases.

The operation of the clutch is as follows: When the motor is started, the rotor 1 is not connected to the shaft 5. The disks 11 and 16 have little or no normal frictional engagement because no pressure is applied laterally and the disks 11 slip idly past the disks 16 which are mounted to rotate with the shaft 5. As the rotor gains in speed, the weighted levers 20 are thrown outward on their pivots 21 by centrifugal force, and the arm 9 exerts a wedging action on the arm 31 on account of their respective inclined engaging surfaces, causing the lever arms 20 to be moved axially as they move outwardly. The axial movement of the arms 20 causes them to exert a pressure against the member 19 which, in turn, presses the disks 11 and 16 together with a force which increases with the speed of the rotor. Owing to the large area presented for frictional engagement by the disks and the power multiplication by the lever and the inclined surfaces of the arms 9 and 31, a comparatively small force on the weights will cause the disks 11 and 16 to engage sufficiently to rotate the shaft 5 and carry the load. Since the connection between the disks is not a rigid one, the load will be taken up gradually and without shock. As the weights fly outward, the ears 23, the ears 24 and the pivots 21 become more nearly in alinement so the tension of the springs 22 is not materially increased during the latter portion of the outward movement of the levers 20. This construction has the effect of diminishing the tendency to slip on account of a slight decrease in speed and the resultant retraction of the weights by the springs. When the motor stops, the levers 20 are retracted by the springs and the pressure is removed from the disks. The speed at which the clutch disks have sufficient frictional engagement to rotate the shaft 5 may be adjusted by varying the number of weights on the arms 20.

It is understood that such modifications may be made in the details of my invention as fall within the scope of the appended claims.

I claim as my invention:

1. In a centrifugal clutch, the combination with a driving member and a driven member, of a plurality of co-acting clutch members on each of said driving and driven members, and a plurality of centrifugally actuated members having a combined radial and axial movement.

2. In a centrifugal clutch, the combination with two rotatable members, of a plurality of friction disks on each of said members, said disks being alternately disposed, and means for effecting frictional engagement of said disks, said means comprising centrifugally actuated members having a combined radial and axial movement.

3. In a centrifugal clutch, the combination with two rotatable members, of a plurality of alternately disposed friction disks carried by each of said members, and a plurality of centrifugally actuated levers having a combined radial and axial movement.

4. In a centrifugal clutch, the combination with a rotatable driven member, and a rotatable driving member rotatably mounted on said driven member, of a plurality of alternately disposed friction elements carried by each of said members, and means for compressing said elements, said means comprising centrifugally actuated levers having a combined radial and axial movement.

5. In a centrifugal clutch, the combination with a rotatable driving member, and a rotatable driven member, of a plurality of clutch elements carried by each of said members, and a plurality of centrifugally actuated members carried by said driving member pivotally and slidably mounted, and means for shifting said last named members axially, when actuated by centrifugal force, to effect engagement of said clutch members.

6. In a centrifugal clutch, the combination with a rotatable driving member and a rotatable driven member, of a plurality of alternately disposed friction disks carried by each of said members, and a plurality of centrifugally actuated levers pivotally mounted on a pressure plate adjacent to said friction disks and slidably carried by said driving member.

7. In a centrifugal clutch, the combination with a rotatable driving member and a rotatable driven member, of a plurality of alternately disposed friction disks carried by each of said members, a plurality of levers actuated by centrifugal force and carried by said driving member, on a slidably mounted pressure plate adjacent to said friction disks, and means for causing an axial movement of said levers and pressure plates when said levers are moved radially by centrifugal force to effect engagement of said friction disks.

8. In a centrifugal clutch, the combination with a rotatable driving member and a rotatable driven member, of a plurality of alternately disposed friction disks carried by each of said members, a plurality of centrifugally actuated levers carried by said driving member pivotally and slidably mounted, and means for shifting said levers axially when moved radially by centrifugal force, said means comprising the engaging inclined faces of projections carried, respectively, by said levers and a fixedly mounted portion of said driving member.

In testimony whereof, I have hereunto subscribed my name this 27th day of February 1913.

ANDREW H. BAKKEN.

Witnesses:
B. B. HINES,
M. C. MERZ.